US012647613B2

(12) United States Patent
Ransom et al.

(10) Patent No.: US 12,647,613 B2
(45) Date of Patent: Jun. 2, 2026

(54) INTER-CODING TRANSFORM FOR AUTOENCODERS

(71) Applicant: Synaptics Incorporated, San Jose, CA (US)

(72) Inventors: Scott Liam Ransom, Cambridge (GB); Parisha Rafiq Ullah, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/495,551

(22) Filed: Oct. 26, 2023

(65) Prior Publication Data

US 2025/0142124 A1 May 1, 2025

(51) Int. Cl.
*H04N 19/60* (2014.01)
*H04N 19/103* (2014.01)
(Continued)

(52) U.S. Cl.
CPC ........... *H04N 19/60* (2014.11); *H04N 19/103* (2014.11); *H04N 19/136* (2014.11); *H04N 19/157* (2014.11); *H04N 19/42* (2014.11)

(58) Field of Classification Search
CPC .... H04N 19/60; H04N 19/103; H04N 19/136; H04N 19/157; H04N 19/42
See application file for complete search history.

(56) References Cited

U.S. PATENT DOCUMENTS

| | | | |
|---|---|---|---|
| 2022/0094928 A1* | 3/2022 | Amirpour | H04N 19/436 |
| 2023/0274555 A1* | 8/2023 | Simoncini | G06V 10/764 |
| | | | 382/103 |

(Continued)

FOREIGN PATENT DOCUMENTS

| | | | | |
|---|---|---|---|---|
| WO | 2022211658 A1 | 10/2022 | | |
| WO | WO-2023197032 A1 * | 10/2023 | | G06N 20/10 |
| WO | WO-2024049627 A1 * | 3/2024 | | |

OTHER PUBLICATIONS

Johnston et al., "Computationally Efficient Neural Image Compression," arXiv:1912.08771v1 [eess.IV] Dec. 18, 2019, pp. 1-9.

(Continued)

*Primary Examiner* — Tracy Y. Li
(74) *Attorney, Agent, or Firm* — Paradice & Li LLP

(57) ABSTRACT

This disclosure provides methods, devices, and systems for video coding. The present implementations more specifically relate to autoencoders that support infer-frame coding in the latent domain. A video encoder may convert a frame of video from the pixel domain to the latent domain based on a machine learning model. For example, the machine learning model may be trained to transform the video frame into a tensor of latent attributes. In some aspects, the video encoder may combine the resulting tensor with a tensor of latent attributes associated with a previously-encoded video frame and transform the resulting tensor into a vector that includes latent attributes from both the current video frame and the previous video frame based on an inter-coding transform. More specifically, the inter-coding transform may reduce a dimensionality of the combined tensor so that the resulting vector is smaller or more compressible than the original tensor of latent attributes.

20 Claims, 8 Drawing Sheets

(51) Int. Cl.
    *H04N 19/136*       (2014.01)
    *H04N 19/157*       (2014.01)
    *H04N 19/42*        (2014.01)

(56)               References Cited

U.S. PATENT DOCUMENTS

2024/0348831 A1 * 10/2024 Deshpande ............ H04N 19/80
2025/0056036 A1 * 2/2025 Mohan ................. H04N 19/503

OTHER PUBLICATIONS

EP Extended Search Report from EP Application No. 24208617.1-1207, dated Mar. 10, 2025.
Yeongwoong Kim et al: "[FCVCM] Response to FCVCM Call for Proposal from Kyung Hee University and ETRI", 144. MPEG Meeting; Oct. 16, 2023-Oct. 20, 2023; Hannover; (Motion Picture Expert Group or ISO/IEC JTC1/SC29/WG11), No. m65200; m65715; Oct. 13, 2023 (Oct. 13, 2023), XP030312665, Retrieved from the Internet: URL:https://dms.mpeg.expert/doc_end_user/documents/144_Hannover/wg11/m65200-v4-m65200_r.zip m65200_v1.docx [retrieved on Oct. 13, 2023].

* cited by examiner

INTER-CODING TRANSFORM FOR AUTOENCODERS

TECHNICAL FIELD

The present implementations relate generally to video coding, and specifically to inter-coding transforms for auto-encoders.

BACKGROUND OF RELATED ART

A digital video is a sequence of digital images (or "frames") that can be displayed or otherwise rendered in succession (such as by a video playback device). Each digital image can be represented by an array of pixel values (or multiple arrays of pixel values associated with different channels). Some video playback devices may receive the sequence of images, over a communication channel (such as a wired or wireless medium), from a source device (such as an image capture device or video data repository). Due to bandwidth limitations of the communication channel, digital image data is often encoded or compressed prior to trans-mission by the source device. Data compression is a tech-nique for encoding information into smaller units of data. As such, data compression can be used to reduce the bandwidth or overhead needed to store or transmit video frames over the communication channel.

Example video compression techniques include "intra-frame" coding and "inter-frame" coding. Intra-frame coding can be used to encode individual frames of video as inde-pendent images (rather than a temporal sequence of images). In other words, the pixel values of an intra-coded video frame can be decoded independently, or without information from any other frames of video. However, adjacent frames of video (such as images displayed successively in time) are likely to be the same or substantially similar in appearance. Thus, inter-frame coding (also referred to as "inter-coding" or "differential coding") can be used to transmit only the differences between successive video frames (also referred to as "residuals"). In other words, a residual frame of video must be combined with one or more previous video frames to recover the pixel values to be displayed for the current video frame.

Some modern video coding systems (such as autoencod-ers) use machine learning to achieve greater levels of data compression. However, machine learning models require significant processing and memory overhead, particularly for encoding residual frames. Thus, new video coding tech-niques are needed to leverage machine learning for data compression while reducing overall resource consumption.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this dis-closure can be implemented in a method of video coding. The method includes steps of receiving a sequence of images; encoding a first image, in the sequence of images, as a tensor of latent attributes associated with the first image based on a machine learning model; performing an inter-coding operation that produces a vector of latent attributes based on the tensor of latent attributes associated with the first image and a tensor of latent attributes associated with a second image, in the sequence of images, received prior to the first image; and transmitting the vector, over a commu-nication channel, to a video decoder.

Another innovative aspect of the subject matter of this disclosure can be implemented in a video encoder that includes a processing system and a memory. The memory stores instructions that, when executed by the processing system, cause the video encoder to receive a sequence of images; encode a first image, in the sequence of images, as a tensor of latent attributes associated with the first image based on a machine learning model; perform an inter-coding operation that produces a vector of latent attributes based on the tensor of latent attributes associated with the first image and a tensor of latent attributes associated with a second image, in the sequence of images, received prior to the first image; and transmit the vector, over a communication channel, to a video decoder.

BRIEF DESCRIPTION OF THE DRAWINGS

The present implementations are illustrated by way of example and are not intended to be limited by the figures of the accompanying drawings.

DETAILED DESCRIPTION

Figure 1:
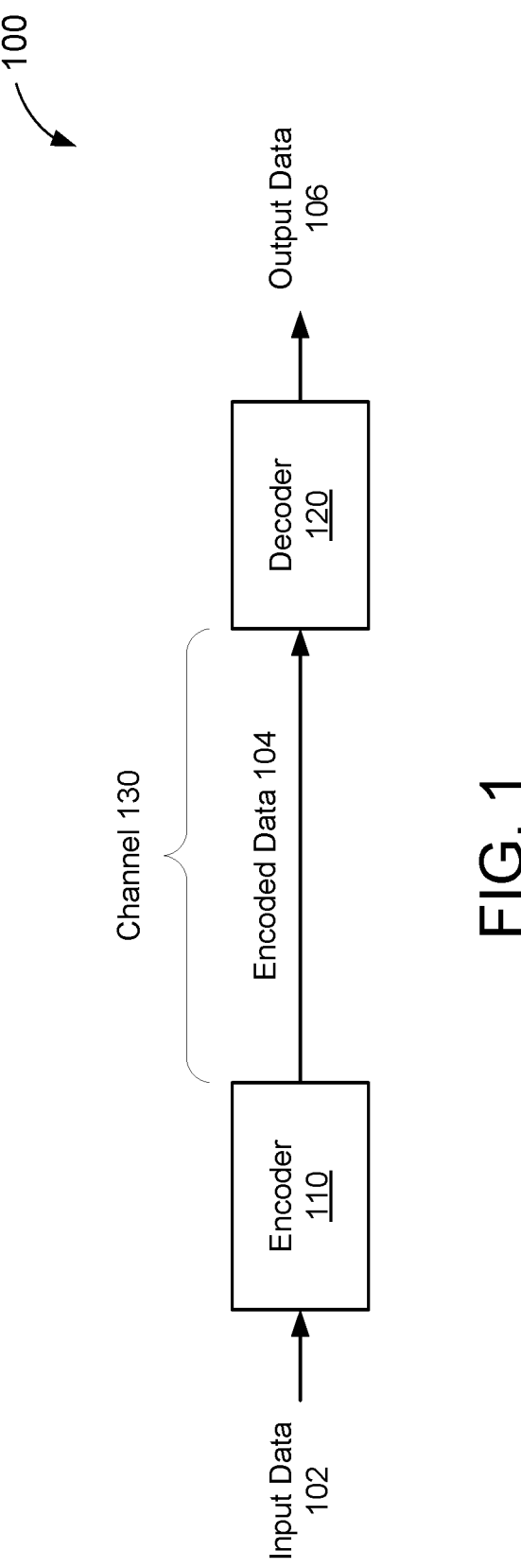
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchange-ably to refer to any system capable of electronically pro-cessing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, some modern video coding systems (such as autoencoders) utilize machine learning to achieve greater levels of data compression. Machine learning is a technique for improving the ability of a computer system or application to perform a specific task. During a training phase, a machine learning system is provided with multiple "answers" and a large volume of raw input data. The machine learning system analyzes the input data to learn a set of rules (also referred to as the "machine learning model") that can be used to map the input data to the answers. During an inferencing phase, the machine learning system uses the trained machine learning model to infer answers from new input data.

Deep learning is a particular form of machine learning in which the inferencing and training phases are performed over multiple layers. Deep learning architectures are often referred to as "artificial neural networks" due to the manner in which information is processed (similar to a biological nervous system). For example, each layer of an artificial neural network may be composed of one or more "neurons." Each layer of neurons may perform a different transformation on the output data from a preceding layer so that the final output of the neural network results in the desired inferences. The set of transformations associated with the various layers of the network is referred to as a "neural network model."

An autoencoder is a type of artificial neural network that is well suited for image compression. For example, an autoencoder can be trained to reproduce, at its output, the same image received at its input. A bottleneck is imposed between the input layer and the output layer of the neural network, which reduces a dimensionality of the outputs at the intermediate layers. As a result of the bottleneck, the autoencoder is forced to learn a compressed representation (or "latent attributes") of the input image. Thus, autoencoder architectures generally include an encoder trained to convert a frame of image data into a lower-dimensional tensor or vector of latent attributes, and a decoder trained to reconstruct the original frame of image data from the tensor or vector of latent attributes.

In a video coding system, the latent attributes represent the compressed image data that is sent by a video encoder, over a communication channel, to a video decoder. For example, the video encoder may implement an encoding portion of an autoencoder, and the video decoder may implement a decoding portion of the autoencoder. However, when using an autoencoder to compress a residual frame of image data (as a result of inter-frame coding), the video encoder must also implement the decoding portion of the autoencoder to recover the previous video frame (from a residual frame of latent attributes) that will be used for inter-coding the next residual frame.

Performing both the encoding and decoding operations of an autoencoder requires substantial processing and memory overhead which may not be practical (or feasible) to implement in some video encoders. However, aspects of the present disclosure recognize that inter-frame coding can be more efficiently integrated with autoencoders by moving the inter-coding framework from the pixel domain to the latent domain. As used herein, the term "latent domain" refers to any data associated with, or operations performed on, latent attributes of an input image (such as after reducing a dimensionality of the input image by an autoencoder). By contrast, the term "pixel domain" refers to any data associated with, or operations performed on, the pixel values of an input image (such as prior to reducing the dimensionality of the input image).

Various aspects relate generally to video coding, and more particularly, to autoencoders that support inter-frame coding in the latent domain. A video encoder may convert a frame of video from the pixel domain to the latent domain based on a machine learning model. For example, the machine learning model may be trained to transform the video frame into a tensor of latent attributes (also referred to as an "encoding tensor"). In some aspects, the video encoder may combine the encoding tensor with a tensor of latent attributes associated with a previously-encoded video frame (also referred to as a "decoding tensor") and transform the resulting tensor into a vector that includes latent attributes from both the current video frame and the previous video frame (also referred to as a "latent vector") based on an inter-coding transform. More specifically, the inter-coding transform may reduce a dimensionality of the combined tensor so that the latent vector is smaller or more compressible than the encoding tensor. The video encoder further transmits the latent vector, over a communication channel, to a video decoder.

In some aspects, the video decoder may combine the latent vector with the decoding tensor and transform the resulting tensor into a tensor of latent attributes associated with the current video frame (also referred to as a "new decoding tensor") based on an inverse inter-coding transform. More specifically, the inverse inter-coding transform may reduce a dimensionality of the combined tensor so that the new decoding tensor can be converted from the latent domain back to the pixel domain by a machine learning model. For example, the machine learning model may be trained to reconstruct the current video frame from the latent attributes included in the new decoding tensor. In some implementations, the video decoder may decode (or decompress) the new decoding tensor as the current video frame based on the machine learning model. In some other implementations, the video encoder may use the new decoding tensor to repeat the inter-coding operation for a new video frame (such as the next video frame in sequence).

Particular implementations of the subject matter described in this disclosure can be implemented to realize one or more of the following potential advantages. Aspects of the present disclosure combine the benefits of inter-frame coding and autoencoders, in an efficient manner, to reduce the size of compressed image data. For example, by performing inter-frame coding in the latent domain associated with an autoencoder, video encoders of the present implementations can encode latent vectors based on previous video frames without having to transform the latent attributes of each video frame back into the pixel domain. Moreover, the inter-coding transform and the inverse inter-coding transform of the present implementations may be substantially smaller than the neural network layers of an autoencoder needed convert the latent attributes from the latent domain to the pixel domain. Thus, compared to existing inter-frame coding techniques, aspects of the present disclosure may significantly reduce the processing and memory overhead of the video encoder.

FIG. 1 shows an example communication system 100 for encoding and decoding data. The communication system 100 includes an encoder 110 and a decoder 120. In some implementations, the encoder 110 and decoder 120 may be provided in respective communication devices such as, for example, computers, switches, routers, hubs, gateways, cameras, displays, or other devices capable of transmitting or receiving communication signals. In some other implementations, the encoder 110 and decoder 120 may be included in the same device or system.

The encoder 110 receives input data 102 to be transmitted or stored via a channel 130. For example, the channel 130 may include a wired or wireless communication medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104, via the channel 130, and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As a result, the output data 106 may be different than the input data 102. Example lossy compression techniques include, among other examples, transform coding (such as through application of a spatial-frequency transform) and quantization (such as through application of a quantization matrix). In contrast, lossless data compression does not result in any loss of information between the encoding and decoding steps as long as the channel 130 does not introduce errors into the encoded data 104. As a result, the output data 106 is identical to the input data 102. Example lossless compression techniques include, among other examples, entropy encoding (such as arithmetic coding, Huffman coding, or Golomb coding) and run-length encoding (RLE).

In some implementations, the encoder 110 and the decoder 120 may utilize machine learning to achieve even greater data compression. As described above, machine learning is a technique for improving the ability of a computer system or application to perform a specific task. During a training phase, a machine learning system is provided with multiple "answers" and a large volume of raw input data. The machine learning system analyzes the input data to learn a set of rules (also referred to as the "machine learning model") that can be used to map the input data to the answers. During an inferencing phase, the machine learning system uses the trained machine learning model to infer answers from new input data.

Deep learning is a particular form of machine learning in which the inferencing and training phases are performed over multiple layers. Deep learning architectures are often referred to as "artificial neural networks" due to the manner in which information is processed (similar to a biological nervous system). For example, each layer of an artificial neural network may be composed of one or more "neurons." Each layer of neurons may perform a different transformation on the output data from a preceding layer so that the final output of the neural network results in the desired inferences. The set of transformations associated with the various layers of the network is referred to as a "neural network model."

An autoencoder is a type of artificial neural network that is well suited for image compression. For example, an autoencoder can be trained to reproduce, at its output, the same image received at its input. A bottleneck is imposed between the input layer and the output layer of the neural network, which reduces a dimensionality of the outputs at the intermediate layers. As a result of the bottleneck, the autoencoder is forced to learn a compressed representation (or "latent attributes") of the input image. Thus, autoencoder architectures generally include an encoder trained to convert a frame of image data into a lower-dimensional tensor or vector of latent attributes, and a decoder trained to reconstruct the original frame of image data from the tensor or vector of latent attributes.

Figure 2:
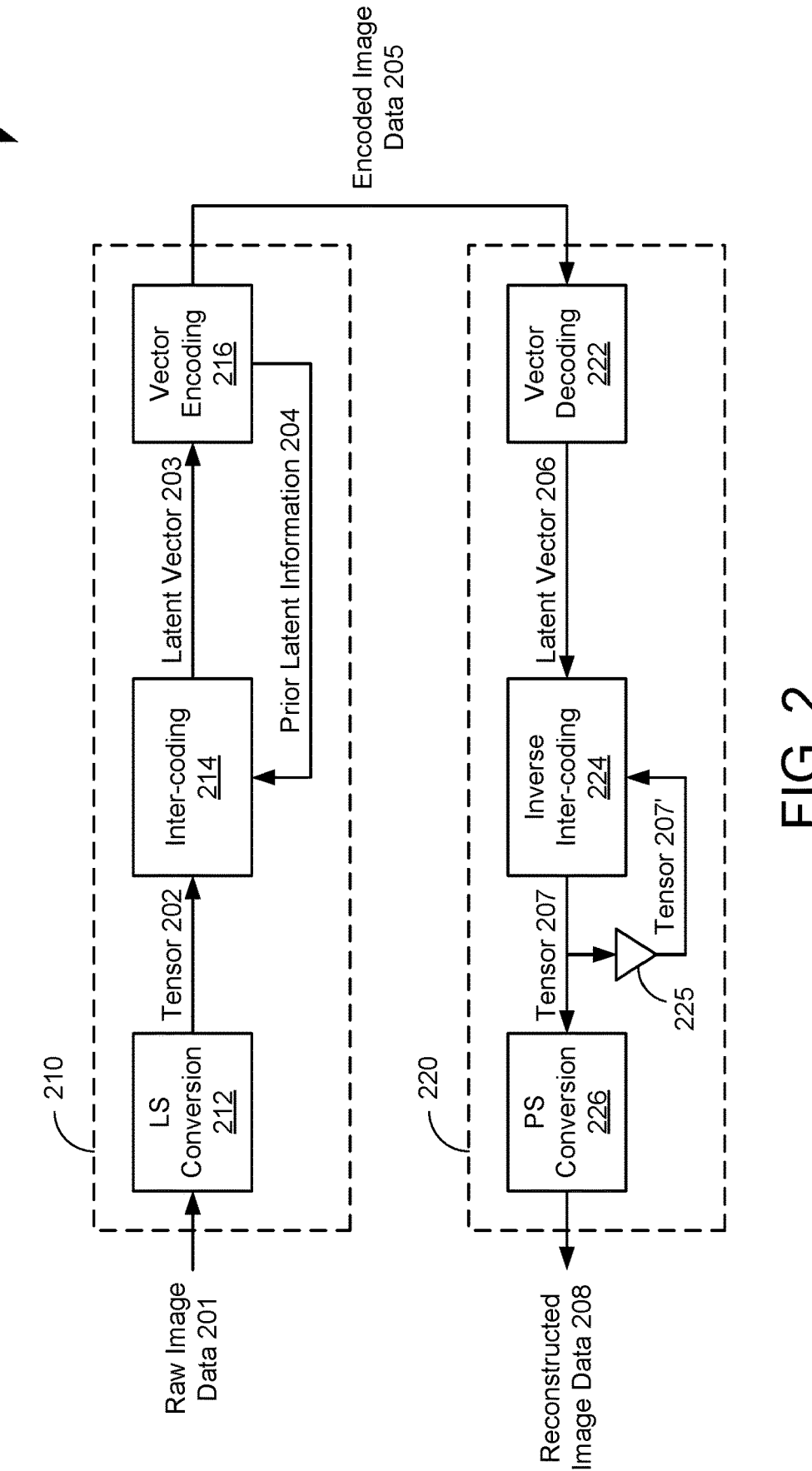
FIG. 2 shows a block diagram of an example video transmission system, according to some implementations.

FIG. 2 shows a block diagram of an example video transmission system 200, according to some implementations. The system 200 includes a video encoder 210 and a video decoder 220. In some implementations, the video encoder 210 and the video decoder 220 may be examples of the encoder 110 and decoder 120, respectively, of FIG. 1. Thus, the video encoder 210 may be communicatively coupled to the video decoder 220 via a channel (such as the channel 130 of FIG. 1).

The video encoder 210 is configured to encode raw image data 201, as encoded image data 205, for transmission to the decoder 220. For example, a frame of raw image data 201 may include an array of pixel values (or multiple arrays of pixel values associated with different color channels) representing a digital image or frame of video captured or acquired by an image source (such as a camera or other image output device). In some aspects, the video encoder 210 may transmit a sequence of frames of encoded image data 205 each representing a respective image or frame of a digital video.

The video decoder 220 is configured to decode the encoded image data 205, as reconstructed image data 208, for display on a display device (such as a television, computer monitor, smartphone, or any other device that includes an electronic display). More specifically, the video decoder 220 may reverse the encoding performed by the video encoder 210 so that the reconstructed image data 208 is substantially similar, if not identical, to the raw image data 201. In some aspects, the video decoder 220 may display or render a sequence of frames of reconstructed image data 208 on the display device.

The video encoder 210 is shown to include a latent space (LS) conversion component 212, an inter-coding component 214, and a vector encoding component 216. The LS conversion component 212 is configured to convert the raw image data 201 from the pixel domain to the latent domain. In some implementations, the LS conversion component 212 may transform the raw image data 201 into a tensor 202 of latent attributes based on a machine learning model. For example, the LS conversion component 212 may perform an encoding operation associated with an autoencoder trained to reduce a dimensionality of the raw image data 201. As a result, the tensor 202 may be a compressed representation of the raw image data 201.

The inter-coding component 214 is configured to produce a latent vector 203 based on the tensor 202 and latent information 204 associated with an image or video frame previously encoded by the encoder 210 (also referred to as "prior latent information"). In some implementations, the prior latent information 204 may include latent attributes of the previous image or video frame. Thus, the inter-coding operation can be performed entirely in the latent domain. For example, the inter-coding component 214 may combine the tensor 202 with the prior latent information 204 so that the latent vector 203 includes at least some latent attributes from each of the previous image and the current image. In some implementations, the resulting latent vector 203 may be smaller or more compressible than the tensor 202.

The vector encoding component 216 is configured to encode the latent vector 203 as one or more codewords, of the encoded image data 205, according to one or more coding schemes. In some implementations, the vector encoding component 216 may perform entropy encoding (or other lossless or lossy compression) on the latent vector 203 to further reduce the amount of encoded image data 205 transmitted to the video decoder 220. In some aspects, the vector encoding component 216 also may recover prior latent information 204 to be used for encoding the next image or video frame received by the video encoder 210. In some implementations, the vector encoding component 216 may perform an inverse inter-coding operation on the latent vector 203 to produce the prior latent information 204.

The video decoder 220 is shown to include a vector decoding component 222, an inverse inter-coding component 224, and a pixel space (PS) conversion component 226. The vector decoding component 222 is configured to recover a latent vector 206 from the encoded image data 205. In some implementations, the vector decoding component 222 may reverse the encoding performed by the vector encoding component 216. For example, the vector decoding component 222 may decode the encoded image data 205, as the latent vector 206, according to the same coding schemes implemented by the vector encoding component 216. As a result, the latent vector 206 may be the same as the latent vector 203.

The inverse inter-coding component 224 is configured to recover a tensor 207 of latent attributes based on the latent vector 206 and a tensor 207' previously recovered by the inverse inter-coding component 224 (also referred to as the "previous tensor"). For example, the previous tensor 207' may include latent attributes of the previous image or video frame decoded by the video decoder 220. In some implementations, the previous tensor 207' may be the same as the prior latent information 204 used by the video encoder 210 to encode the current image or video frame. The inverse inter-coding component 224 may combine the latent vector 206 with the previous tensor 207' so that the resulting tensor 207 includes at least some latent attributes from each of the previous image and the current image. In some implementations, the resulting tensor 207 may be stored in a buffer 225, as a previous tensor 207', to be used for decoding the next image or video frame.

The PS conversion component 226 is configured to convert the tensor 207 from the latent domain back to the pixel domain. In some implementations, the PS conversion component 226 may transform the tensor 207 into the reconstructed image data 208 based on a machine learning model. For example, the PS conversion component 226 may perform a decoding operation associated with an autoencoder trained to reconstruct the raw image data 201 from the tensor 207. As a result, the reconstructed image data 208 may be substantially similar, if not identical, to the raw image data 201. In some implementations, the reconstructed image data 208 may be further displayed or rendered as a digital image on an electronic display (not shown for simplicity).

In some aspects, the LS conversion component 212, the inter-frame coding component 214, the inverse inter-coding component 224, and the PS conversion component 226 may be collectively trained as an autoencoder that reproduces, at its output, the same image received at its input. However, unlike existing autoencoders, the autoencoder of the present implementations is trained to reproduce each output image based on latent attributes of the current input image and latent attributes of a previous input image. Due to the inter-coding operations performed in the latent domain (such as by the inter-coding component 214 and the inverse inter-coding component 224), the output layer of the LS conversion component 212 is different than the input layer of the PS conversion component 224. Accordingly, the tensor 207 may be different than the tensor 202 for the same image.

Figure 3:
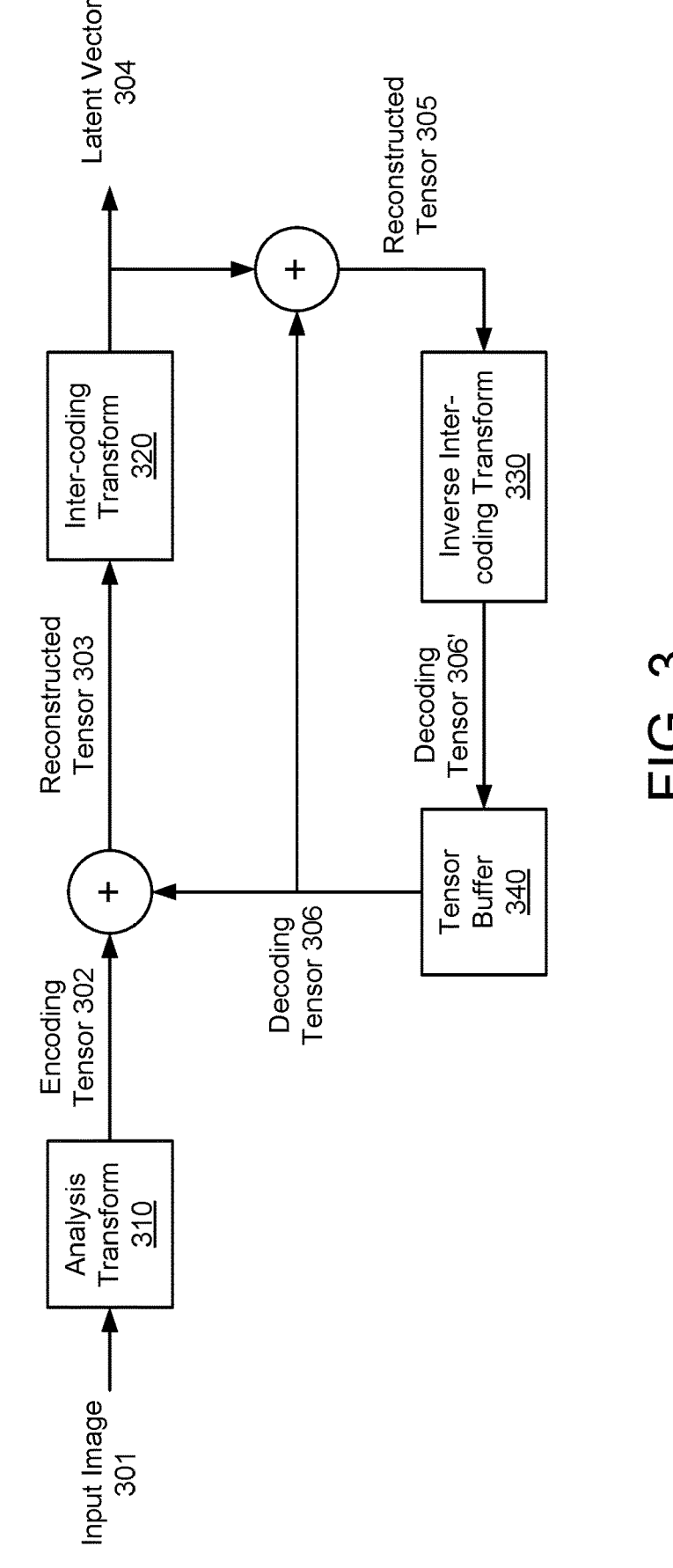
FIG. 3 shows a block diagram of an example video encoding system, according to some implementations.

FIG. 3 shows a block diagram of an example video encoding system 300, according to some implementations. In some implementations, the video encoding system 300 may be one example of the video encoder 210 of FIG. 2. More specifically, the video encoding system 300 is config-ured to encode an input image 301 as a vector 304 of latent attributes (also referred to as a "latent vector") based, at least in part, on latent attributes of an input image previously encoded by the video encoding system 300 (also referred to as the "previous input image"). With reference to FIG. 2, the input image 301 may be one example of the raw image data 201 and the latent vector 304 may be one example of the latent vector 203.

The video encoding system 300 includes an analysis transform 310, an inter-coding transform 320, and an inverse inter-coding transform 330.

The analysis transform 310 transforms the input image 301 into a tensor 302 of latent attributes associated with the input image 301 (also referred to as an "encoding tensor") based on a neural network model. In other words, the analysis transform 310 converts the input image 301 from the pixel domain to the latent domain. With reference to FIG. 2, the analysis transform 310 may be one example of the LS conversion component 212.

In some implementations, the analysis transform 310 may include multiple layers of a convolutional neural network (CNN) trained to reduce a dimensionality of the input image 301. For example, the input image 301 may be represented by a three-dimensional array of pixel values having a particular height ($h_i$), width ($w_i$), and depth ($d_i$), depending on the image format. The CNN produces the encoding tensor 302 at its output as a result of processing the input image 301 through various convolutional layers, pooling layers, or any combination thereof, that reduce the dimensionality of the input image 301. Thus, the encoding tensor 302 at the output of the CNN is a compressed representation of the input image 301. In some implementations, the encoding tensor 302 may be a three-dimensional tensor (h, w, $d_a$) having a height h, width w, and depth $d_a$, where $h < h_i$, $w < w_i$, and $d_a > d_i$.

The video encoding system 300 combines the encoding tensor 302 with a tensor 306 of latent attributes associated with the previous input image (also referred to as a "decod-ing tensor") to produce a reconstructed tensor 303. With reference to FIG. 2, the decoding tensor 306 may be one example of the prior latent information 204. In some imple-mentations, the decoding tensor 306 may be a three-dimensional tensor (h, w, $d_s$) having the same height h and width w as the encoding tensor 302, with a depth $d_s$ that is the same or different than the depth $d_a$ of the encoding tensor 302, and the reconstructed tensor 303 may be a concatenation of the encoding tensor 302 and the decoding tensor 306. Thus, the reconstructed tensor 303 also may be a three-dimensional tensor (h, w, $d_{r1}$) having the same height h and width w as each of the tensors 302 and 306, and a depth $d_{r1}$ equal to the combined depths of the tensors 302 and 306 ($d_{r1} = d_a + d_s$).

The inter-coding transform 320 transforms the recon-structed tensor 303 into the latent vector 304 by reducing a dimensionality of the reconstructed tensor 303. In some aspects, the inter-coding transform 320 may be any linear or nonlinear transform that maintains the height h and width w of the reconstructed tensor 303 while reducing its depth $d_{r1}$. As a result, the latent vector 304 may be a three-dimensional tensor (h, w, $d_l$) having the same height h and width w as the reconstructed tensor 303, and a depth $d_l$ that is less than the depth $d_{r1}$ of the reconstructed tensor 303. In some imple-mentations, the inter-coding transform 320 may include one or more layers of a CNN trained to transform the recon-structed tensor 303 into a latent vector 304 that is smaller or more compressible than the encoding tensor 302. As described with reference to FIG. 2, the latent vector 304 may be further entropy encoded and transmitted, over a commu-nication channel, to a video decoder (not shown for sim-plicity).

In some aspects, the video encoding system 300 may use the latent vector 304, in a recursive feedback loop, to encode the next input image in the sequence of images. For example, the video encoding system 300 may combine the latent vector 304 with the decoding tensor 306 to produce another reconstructed tensor 305. In some implementations, the reconstructed tensor 305 may be a concatenation of the latent vector 304 and the decoding tensor 306. As such, the reconstructed tensor 305 also may be a three-dimensional tensor (h, w, $d_{r2}$) having the same height h and width w as the latent vector 304 and the decoding tensor 306, and a depth $d_{r2}$ equal to the combined the depths of the latent vector 304 and the decoding tensor 306 ($d_{r2} = d_l + d_s$).

The inverse inter-coding transform 330 transforms the reconstructed tensor 305 into a new decoding tensor 306', which includes latent attributes of the current input image 301, by reducing a dimensionality of the reconstructed tensor 305. In some aspects, the inverse inter-coding trans-form 330 may be any linear or nonlinear transform that maintains the height h and width w of the reconstructed tensor 305 while reducing its depth $d_{r2}$. As a result, the depth $d_s$ of the decoding tensor 306' is less than the depth $d_{r2}$ of the reconstructed tensor 305. In some implementations, the inverse inter-coding transform 330 may include one or more layers of a CNN trained to transform the reconstructed tensor 305 into a decoding tensor 306' that can be converted back to the pixel domain (as the original input image 301). The new decoding tensor 306' may be stored in a tensor buffer 340, as a decoding tensor 306, to be used for encoding the next input image.

Figure 4:
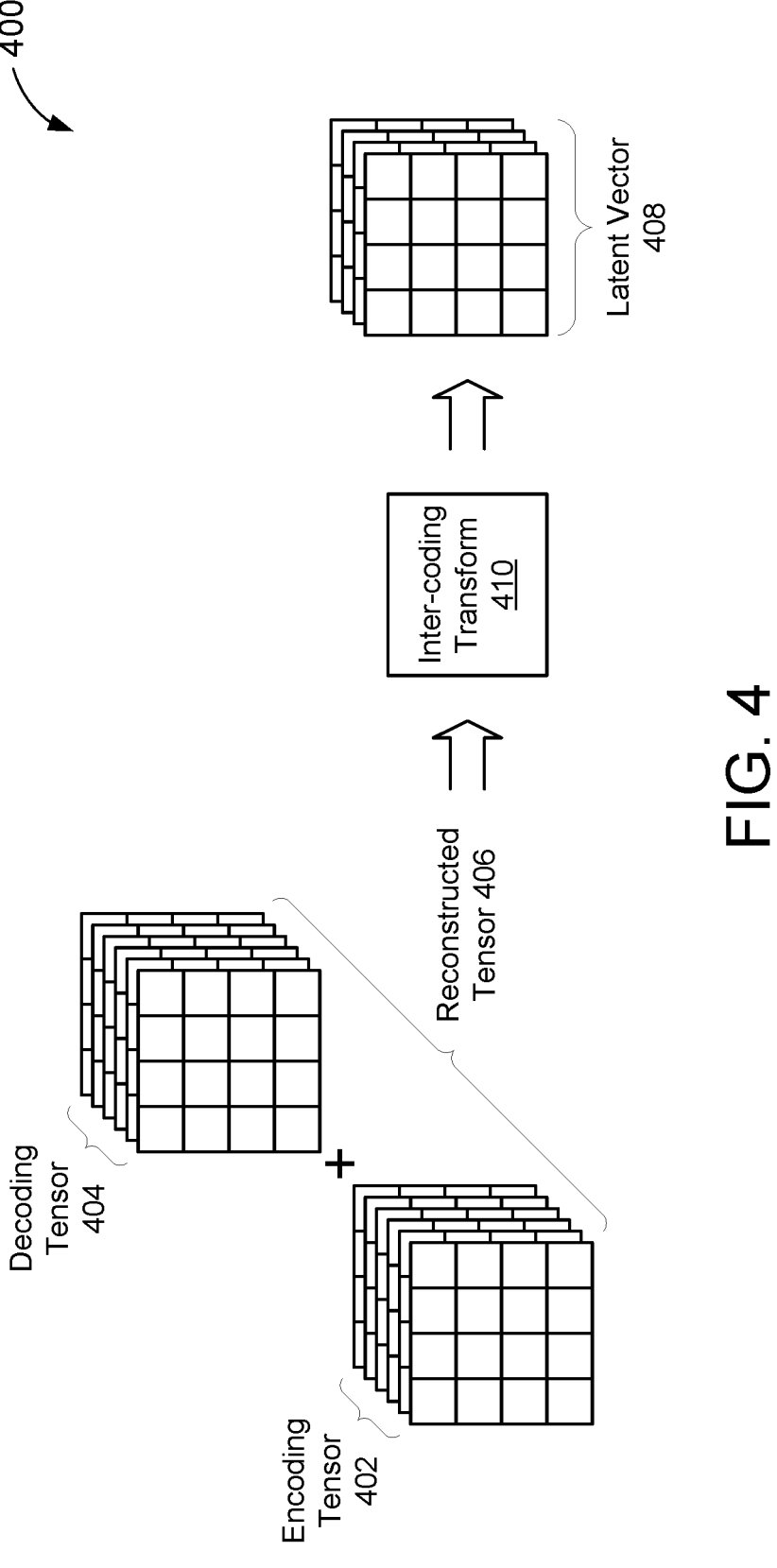
FIG. 4 shows an example inter-coding operation that can be performed in a latent domain, according to some imple-mentations.

FIG. 4 shows an example inter-coding operation 400 that can be performed in a latent domain, according to some implementations. The example operation 400 may be per-formed by a video encoder (such as the video encoder 210 of FIG. 2 or the video encoding system 300 of FIG. 3) to produce a latent vector 408 based on an encoding tensor 402 and a decoding tensor 404. In some implementations, the encoding tensor 402, decoding tensor 404, and latent vector 408 may be examples of the encoding tensor 302, decoding tensor 306, and latent vector 304, respectively, of FIG. 3.

In the example of FIG. 4, the encoding tensor 402 is depicted as a three-dimensional tensor (h, w, $d_a$) having height h=4, width w=4, and depth $d_a$=6, and the decoding tensor 404 is depicted as a three-dimensional tensor (h, w, $d_s$) having height h=4, width w=4, and depth $d_s$=6. For simplicity, the depth $d_a$ of the encoding tensor 402 is shown to be the same as the depth $d_s$ of the decoding tensor 404 ($d_a$=$d_s$). However, in actual implementations, the tensors 402 and 404 may have different depths. The encoding tensor 402 is combined with the decoding tensor 404 to produce a reconstructed tensor 406. In some implementations, the reconstructed tensor 406 may be one example of the reconstructed tensor 303 of FIG. 3. As shown in FIG. 4, the tensors 402 and 404 are concatenated in a manner which preserves their height h and width w while combining their depths $d_a$ and $d_s$. As a result, the reconstructed tensor 406 is a three-dimensional tensor (h, w, $d_{r1}$) having height h=4, width w=4, and depth $d_{r1}$=12 ($d_{r1}$=$d_a$+$d_s$).

An inter-coding transform 410 converts the reconstructed tensor 406 into the latent vector 408. In some implementations, the inter-coding transform 410 may be one example of the inter-coding transform 320 of FIG. 3. For example, the inter-coding transform 410 may include one or more layers of a CNN trained to reduce a dimensionality of the reconstructed tensor 406 to produce a latent vector 408 that is smaller or more compressible than the encoding tensor 402. In the example of FIG. 4, the latent vector 408 is depicted as a three-dimensional tensor (h, w, $d_l$) having height h=4, width w=4, and depth $d_l$=4. However, in actual implementations, the latent vector 408 may have any depth $d_l$ less than that of the reconstructed tensor 406 ($d_l$<$d_{r1}$). In some implementations, the latent vector 408 may have the same depth as the encoding tensor 402 or the decoding tensor 404.

Figure 5:
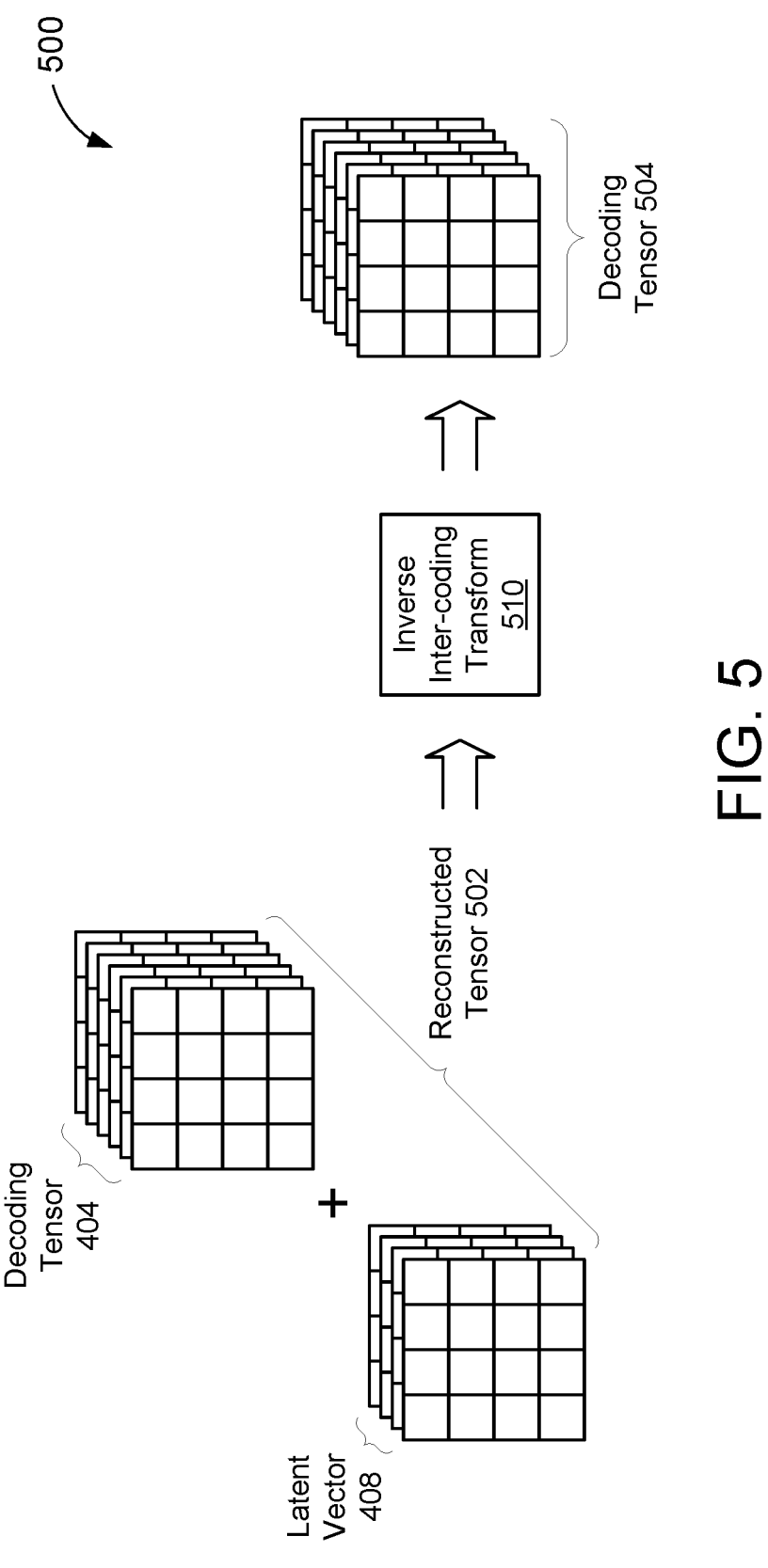
FIG. 5 shows an example inverse inter-coding operation that can be performed in a latent domain, according to some implementations.

FIG. 5 shows an example inverse inter-coding operation 500 that can be performed in a latent domain, according to some implementations. The example operation 500 may be performed by a video encoder (such as the video encoder 210 of FIG. 2 or the video encoding system 300 of FIG. 3), or a video decoder (such as the video decoder 220 of FIG. 2), to recover a decoding tensor 504 based on the latent vector 408 and the decoding tensor 404 of FIG. 4. In some implementations, the decoding tensor 504 may be one example of the decoding tensor 306' of FIG. 3.

As described with reference to FIG. 4, the decoding tensor 404 is a three-dimensional tensor (h, w, $d_s$) having height h=4, width w=4, and depth $d_s$=6, and the latent vector 408 is a three-dimensional tensor (h, w, $d_l$) having height h=4, width w=4, and depth $d_l$=4. The latent vector 408 is combined with the decoding tensor 404 to produce a reconstructed tensor 502. In some implementations, the reconstructed tensor 502 may be one example of the reconstructed tensor 305 of FIG. 3. As shown in FIG. 5, the latent vector 408 and the decoding tensor 404 are concatenated in a manner which preserves their height h and width w while combining their depths $d_l$ and $d_s$. As a result, the reconstructed tensor 502 is a three-dimensional tensor (h, w, $d_{r2}$) having height h=4, width w=4, and depth $d_{r2}$=10 ($d_{r2}$=$d_l$+$d_s$).

An inverse inter-coding transform 510 converts the reconstructed tensor 502 into the decoding tensor 504. In some implementations, the inverse inter-coding transform 510 may be one example of the inverse inter-coding transform 330 of FIG. 3. For example, the inverse inter-coding transform 510 may include one or more layers of a CNN trained to reduce a dimensionality of the reconstructed tensor 502 to produce a decoding tensor 504 that can be converted back to the pixel domain (as the original input image). As shown in FIG. 5, the decoding tensor 504 has the same dimensions as the decoding tensor 404. In other words, the decoding tensor 504 is a three-dimensional tensor (h, w, $d_s$) having height h=4, width w=4, and depth $d_s$=6.

Figure 6:
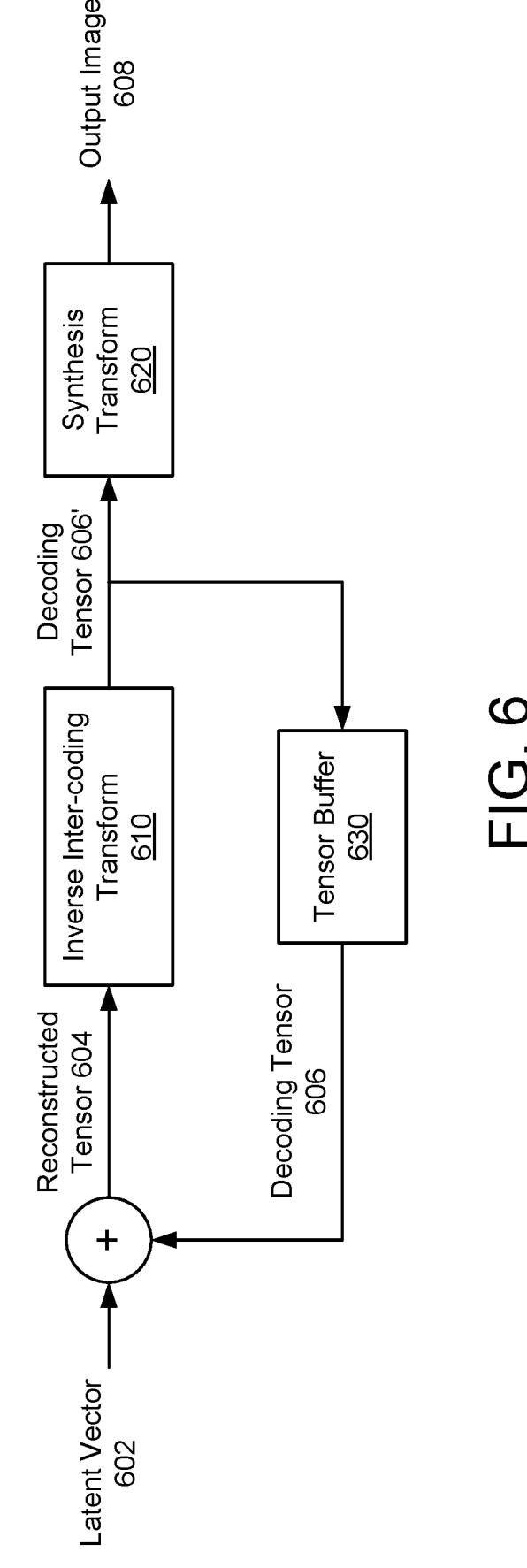
FIG. 6 shows a block diagram of an example video decoding system, according to some implementations.

FIG. 6 shows a block diagram of an example video decoding system 600, according to some implementations. In some implementations, the video decoding system 600 may be one example of the video decoder 220 of FIG. 2. More specifically, the video decoding system 600 is configured to decode a latent vector 602 as an output image 608 based, at least in part, on latent attributes of an output image previously decoded by the video decoding system 600 (also referred to as the "previous output image"). With reference to FIG. 2, the latent vector 602 may be one example of the latent vector 206 and the output image 608 may be one example of the reconstructed image data 208.

In some implementations, the latent vector 602 may be a three-dimensional tensor (h, w, $d_l$) having a height h, width w, and depth $d_l$. The video decoding system 600 combines the latent vector 602 with a tensor 606 of latent attributes associated with the previous output image (also referred to as a "decoding tensor") to produce a reconstructed tensor 604. With reference to FIG. 2, the decoding tensor 606 may be one example of the tensor 207'. In some implementations, the decoding tensor 606 may be a three-dimensional tensor (h, w, $d_s$) having the same height h and width w as the latent vector 602, with a depth $d_s$ that is the same or different than the depth $d_l$ of the latent vector 602, and the reconstructed tensor 604 may be a concatenation of the latent vector 602 and the decoding tensor 606 (such as described with reference to FIG. 5). Thus, the reconstructed tensor 604 also may be a three-dimensional tensor (h, w, $d_r$) having the same height h and width w as the latent vector 602 and the decoding tensor 606, and a depth $d_r$ equal to the combined depths of the latent vector 602 and the decoding tensor 606 ($d_r$=$d_l$+$d_s$).

The video decoding system 600 includes an inverse inter-coding transform 610 and a synthesis transform 620. The inverse inter-coding transform 610 transforms the reconstructed tensor 604 into a new decoding tensor 606', which includes latent attributes of the current output image 608, by reducing a dimensionality of the reconstructed tensor 604 (such as described with reference to FIG. 5). In some implementations, the inverse inter-coding transform 610 may be the same as the inverse inter-coding transform 330 of FIG. 3. Thus, the inverse inter-coding transform 610 be any linear or nonlinear transform that maintains the height h and width w of the reconstructed tensor 604 while reducing its depth $d_r$. As a result, the depth $d_s$ of the decoding tensor 606' is less than the depth $d_r$ of the reconstructed tensor 604. The new decoding tensor 606' may be stored in a tensor buffer 630, as a decoding tensor 606, to be used for decoding the next latent vector.

The synthesis transform 620 transforms the decoding tensor 606' into the output image 608 based on a neural network model. In other words, the synthesis transform 620 converts the decoding tensor 606' from the latent domain to the pixel domain. With reference to FIG. 2, the synthesis transform 620 may be one example of the PS conversion component 226. In some implementations, the synthesis transform 620 may include multiple layers of a CNN trained to up-sample the decoding tensor 606'. For example, the CNN may reconstruct the output image 608 as a result of processing the decoding tensor 606' through various convolutional layers, pooling layers, or any combination thereof, that increases the dimensionality of the decoding tensor 606'. Thus, the output image 608 is a decompressed representation of the decoding tensor 606'. In some implementations, the output image 608 may be represented by a three-dimensional array of pixel values having a particular height ($h_o$), width ($w_o$), and depth ($d_o$), where $h_o > h$, $w_o > w$, and $d_o < d_s$.

Figure 7:
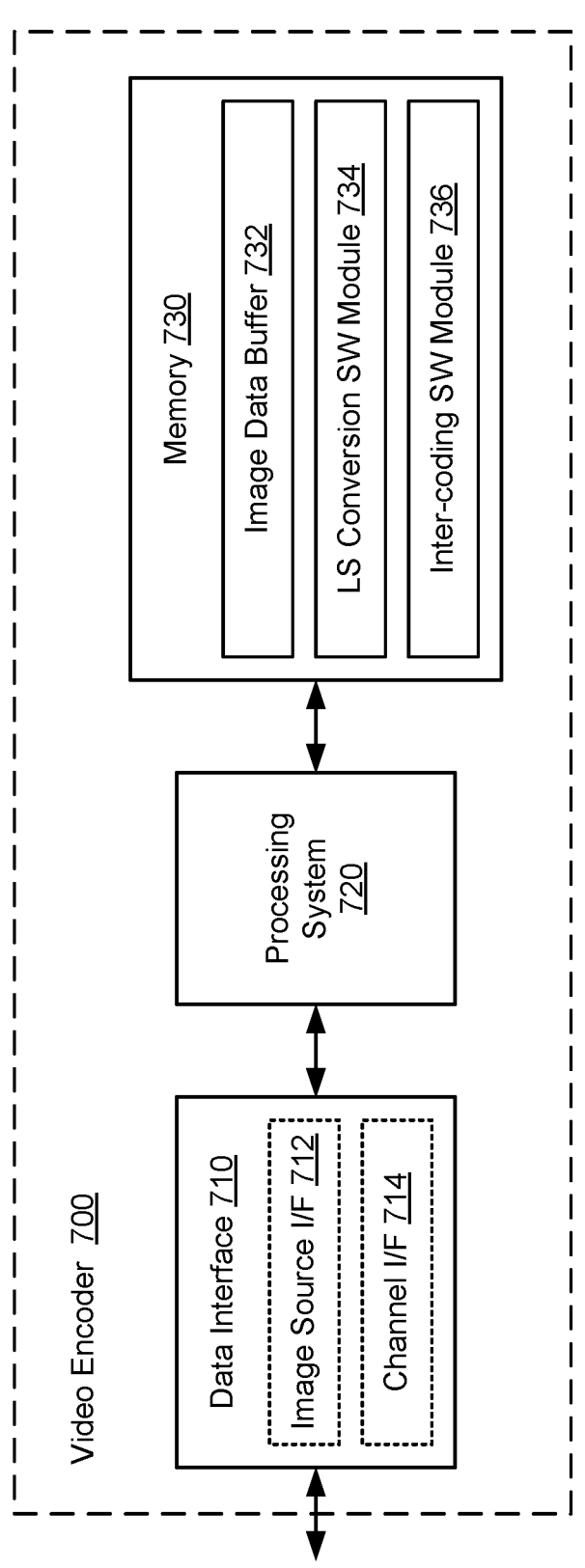
FIG. 7 shows a block diagram of an example video encoder, according to some implementations.

FIG. 7 shows a block diagram of a video encoder 700, according to some implementations. In some implementations, the video encoder 700 may be one example of the video encoder 210 of FIG. 2 or the video encoding system 300 of FIG. 3. More specifically, the video encoder 700 may be configured to encode a sequence of images or video frames for transmission over a communication channel.

In some implementations, the video encoder 700 may include a data interface 710, a processing system 720, and a memory 730. The data interface 710 is configured to receive image data from an image source and output a vector of latent attributes, associated with the image data, over the communication channel. In some aspects, the data interface 710 may include an image source interface (I/F) 712 to communicate with the image source and a channel interface 714 to communicate via the communication channel. In some implementations, the image source interface 712 may receive a sequence of images from the image source, and the channel interface 714 may transmit the latent vector, over the communication channel, to a video decoder.

The memory 730 may include an image data buffer 732 to store any image data or intermediate data associated with the encoding operation. The memory 730 also may include a non-transitory computer-readable medium (including one or more nonvolatile memory elements, such as EPROM, EEPROM, Flash memory, a hard drive, and the like) that may store at least the following software (SW) modules:

- a latent space (LS) conversion SW module 734 to encode a first image, in the sequence of images, as a tensor of latent attributes associated with the first image based on a machine learning model; and
- an inter-coding SW module 736 to perform an inter-coding operation that produces the vector of latent attributes based on the tensor of latent attributes associated with the first image and a tensor of latent attributes associated with a second image, in the sequence of images, received prior to the first image.

Each software module includes instructions that, when executed by the processing system 720, causes the video encoder 700 to perform the corresponding functions.

The processing system 720 may include any suitable one or more processors capable of executing scripts or instructions of one or more software programs stored in the encoder 700 (such as in memory 730). For example, the processing system 720 may execute the LS conversion SW module 734 to encode a first image, in the sequence of images, as a tensor of latent attributes associated with the first image based on a machine learning model. The processing system 720 may further execute the inter-coding SW module 736 to perform an inter-coding operation that produces the vector of latent attributes based on the tensor of latent attributes associated with the first image and a tensor of latent attributes associated with a second image, in the sequence of images, received prior to the first image.

Figure 8:
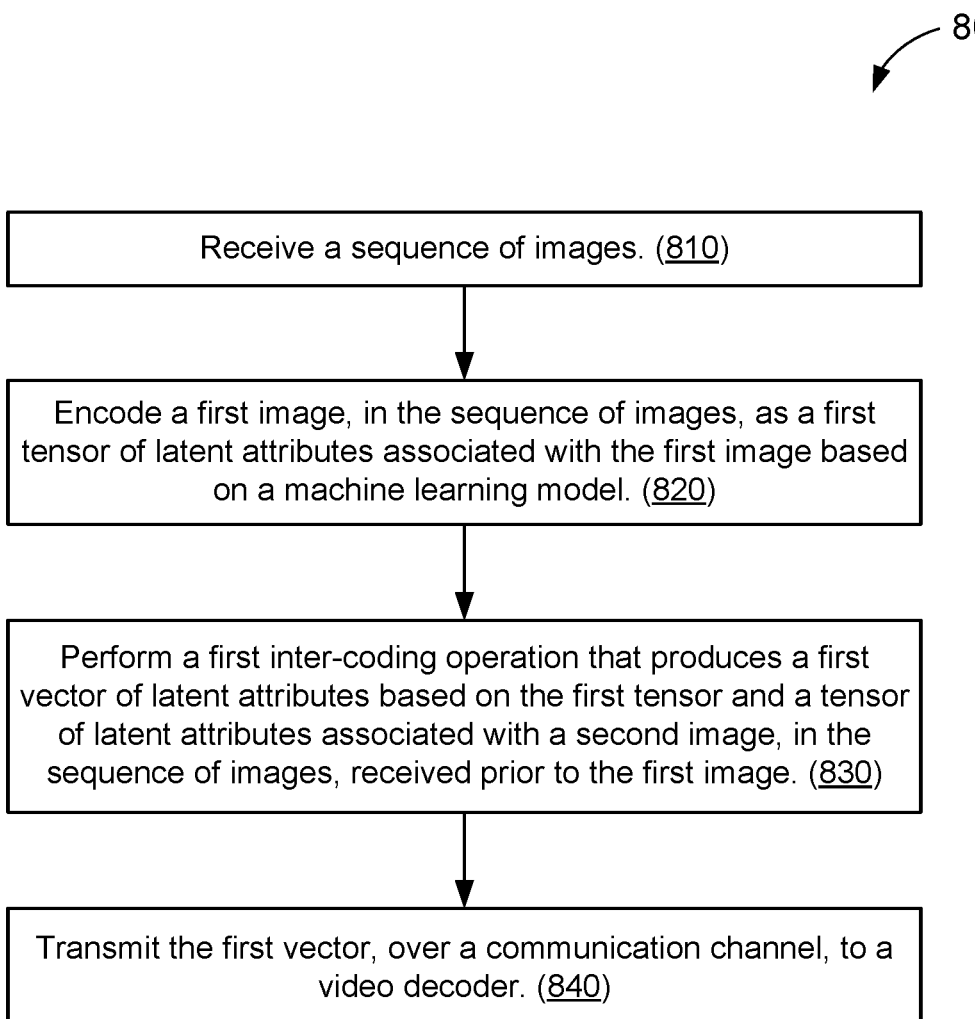
FIG. 8 shows an illustrative flowchart depicting an example operation for video coding, according to some implementations.

FIG. 8 shows an illustrative flowchart depicting an example operation 800 for video coding, according to some implementations. In some implementations, the example operation 800 may be performed by a video encoder such as the video encoder 210 of FIG. 2, the video encoding system 300 of FIG. 3, or the video encoder 700 of FIG. 7.

The video encoder receives a sequence of images (810). The video encoder encodes a first image, in the sequence of images, as a first tensor of latent attributes associated with the first image based on a machine learning model (820). The video encoder performs a first inter-coding operation that produces a first vector of latent attributes based on the first tensor and a tensor of latent attributes associated with a second image, in the sequence of images, received prior to the first image (830). In some implementations, the performing of the first inter-coding operation may include generating a first reconstructed tensor based on the first tensor and the tensor of latent attributes associated with the second image; and encoding the first reconstructed tensor as the first vector based on an inter-coding transform that reduces a dimensionality of the first reconstructed tensor. The video encoder further transmits the first vector, over a communication channel, to a video decoder (840).

In some implementations, the first tensor, the tensor of latent attributes associated with the second image, the first reconstructed tensor, and the first vector may each have a respective height, width, and depth. In some implementations, the first vector may have the same height and the same width as each of the first reconstructed tensor, the first tensor, and the tensor of latent attributes associated with the second image. In some implementations, the depth of the first vector may be less than the depth of the first reconstructed tensor. In some implementations, the generating of the first reconstructed tensor may include concatenating the first tensor and the tensor of latent attributes associated with the second image so that the depth of the first reconstructed tensor is equal to the sum of the depths of the first tensor and the tensor of latent attributes associated with the second image.

In some aspects, the video encoder may further perform an inverse inter-coding operation that produces a second tensor of latent attributes associated with the first image based on the first vector and the tensor of latent attributes associated with the second image; encode a third image, in the sequence of images, as a tensor of latent attributes associated with the third image based on the machine learning model; perform a second inter-coding operation that produces a second vector of latent attributes based on the second tensor and the tensor of latent attributes associated with the third image; and transmit the second vector, over the communication channel, to the video decoder. In some implementations, the performing of the second inter-coding operation may include generating a second reconstructed tensor based on the second tensor and the tensor of latent attributes associated with the third image; and encoding the second reconstructed tensor as the second vector based on the inter-coding transform.

In some aspects, the performing of the inverse inter-coding operation may include generating a second reconstructed tensor based on the first vector and the tensor of latent attributes associated with the second image; and decoding the second reconstructed tensor as the second tensor based on an inverse inter-coding transform that reduces a dimensionality of the second reconstructed tensor. In some implementations, the generating of the second reconstructed tensor may include concatenating the first vector and the tensor of latent attributes associated with the second image so that the depth of the second reconstructed tensor is equal to the sum of the depths of the first vector and the tensor of latent attributes associated with the second image.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of video coding performed by a video encoder, comprising:
   receiving a sequence of images;
   encoding a first image, in the sequence of images, as a first tensor of latent attributes associated with the first image based on a machine learning model;
   performing a first inter-coding operation that produces a first vector of latent attributes based on a combination of the first tensor and a tensor of latent attributes associated with a second image, in the sequence of images, received prior to the first image, the first vector including latent attributes from the first image and the second image;
   performing an inverse inter-coding operation that produces a second tensor of latent attributes based in part on the first vector of latent attributes;
   performing a second inter-coding operation that produces a second vector of latent attributes based in part on the second tensor of latent attributes; and
   transmitting the first vector and the second vector, over a communication channel, to a video decoder.

2. The method of claim 1, wherein the performing of the first inter-coding operation comprises:
   generating a first reconstructed tensor based on the first tensor and the tensor of latent attributes associated with the second image; and encoding the first reconstructed tensor as the first vector based on an inter-coding transform that reduces a dimensionality of the first reconstructed tensor.

3. The method of claim 2, wherein the first tensor, the tensor of latent attributes associated with the second image, the first reconstructed tensor, and the first vector each has a respective height, width, and depth.

4. The method of claim 3, wherein the first vector has the same height and the same width as each of the first reconstructed tensor, the first tensor, and the tensor of latent attributes associated with the second image.

5. The method of claim 4, wherein the depth of the first vector is less than the depth of the first reconstructed tensor.

6. The method of claim 4, wherein the generating of the first reconstructed tensor comprises:
   concatenating the first tensor and the tensor of latent attributes associated with the second image so that the depth of the first reconstructed tensor is equal to the sum of the depths of the first tensor and the tensor of latent attributes associated with the second image.

7. The method of claim 4, wherein the second tensor of latent attributes is associated with the first image and further based on the tensor of latent attributes associated with the second image, the method further comprising:
   encoding a third image, in the sequence of images, as a tensor of latent attributes associated with the third image based on the machine learning model, wherein the second vector of latent attributes is further based on the tensor of latent attributes associated with the third image.

8. The method of claim 7, wherein the performing of the inverse inter-coding operation comprises:
   generating a second reconstructed tensor based on the first vector and the tensor of latent attributes associated with the second image; and
   decoding the second reconstructed tensor as the second tensor based on an inverse inter-coding transform that reduces a dimensionality of the second reconstructed tensor.

9. The method of claim 8, wherein the generating of the second reconstructed tensor comprises:
   concatenating the first vector and the tensor of latent attributes associated with the second image so that the depth of the second reconstructed tensor is equal to the sum of the depths of the first vector and the tensor of latent attributes associated with the second image.

10. The method of claim 7, wherein the performing of the second inter-coding operation comprises:
   generating a second reconstructed tensor based on the second tensor and the tensor of latent attributes associated with the third image; and
   encoding the second reconstructed tensor as the second vector based on the inter-coding transform.

11. A video encoder comprising:
   a processing system; and
   a memory storing instructions that, when executed by the processing system, causes the video encoder to:
      receive a sequence of images;
      encode a first image, in the sequence of images, as a first tensor of latent attributes associated with the first image based on a machine learning model;
      perform a first inter-coding operation that produces a first vector of latent attributes based on a combination of the first tensor and a tensor of latent attributes associated with a second image, in the sequence of images, received prior to the first image, the first vector including latent attributes from the first image and the second image;

perform an inverse inter-coding operation that produces a second tensor of latent attributes based in part on the first vector of latent attributes;

perform a second inter-coding operation that produces a second vector of latent attributes based in part on the second tensor of latent attributes; and transmit the first vector, over a communication channel, to a video decoder.

12. The video encoder of claim 11, wherein the performing of the first inter-coding operation comprises:

generating a first reconstructed tensor based on the first tensor and the tensor of latent attributes associated with the second image; and encoding the first reconstructed tensor as the first vector based on an inter-coding transform that reduces a dimensionality of the first reconstructed tensor.

13. The video encoder of claim 12, wherein the first tensor, the tensor of latent attributes associated with the second image, the first reconstructed tensor, and the first vector each has a respective height, width, and depth.

14. The video encoder of claim 13, wherein the first vector has the same height and the same width as each of the first reconstructed tensor, the first tensor, and the tensor of latent attributes associated with the second image.

15. The video encoder of claim 14, wherein the depth of the first vector is less than the depth of the first reconstructed tensor.

16. The video encoder of claim 14, wherein the generating of the first reconstructed tensor comprises:

concatenating the first tensor and the tensor of latent attributes associated with the second image so that the depth of the first reconstructed tensor is equal to the sum of the depths of the first tensor and the tensor of latent attributes associated with the second image.

17. The video encoder of claim 14, wherein the second tensor of latent attributes is associated with the first image and further based on the tensor of latent attributes associated with the second image, the instructions further causing the video encoder to:

encode a third image, in the sequence of images, as a tensor of latent attributes associated with the third image based on the machine learning model, wherein the second vector of latent attributes is further based on the tensor of latent attributes associated with the third image.

18. The video encoder of claim 17, wherein the performing of the inverse inter-coding operation comprises:

generating a second reconstructed tensor based on the first vector and the tensor of latent attributes associated with the second image; and decoding the second reconstructed tensor as the second tensor based on an inverse inter-coding transform that reduces a dimensionality of the second reconstructed tensor.

19. The video encoder of claim 18, wherein the generating of the second reconstructed tensor comprises:

concatenating the first vector and the tensor of latent attributes associated with the second image so that the depth of the second reconstructed tensor is equal to the sum of the depths of the first vector and the tensor of latent attributes associated with the second image.

20. The video encoder of claim 17, wherein the performing of the second inter-coding operation comprises:

generating a second reconstructed tensor based on the second tensor and the tensor of latent attributes associated with the third image; and encoding the second reconstructed tensor as the second vector based on the inter-coding transform.

* * * * *